United States Patent
Grethel et al.

(10) Patent No.: US 8,366,412 B2
(45) Date of Patent: Feb. 5, 2013

(54) COMPRESSOR DRIVE SYSTEM WITH VARIABLE ROTATIONAL SPEED

(75) Inventors: Marco Grethel, Bühlertal (DE); Eric Müller, Kaiserslautern (DE); Reinhard Stehr, Bühl (DE); Andreas Triller, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 980 days.

(21) Appl. No.: 12/313,907

(22) Filed: Nov. 24, 2008

(65) Prior Publication Data

US 2009/0173318 A1 Jul. 9, 2009

Related U.S. Application Data

(60) Provisional application No. 61/004,105, filed on Nov. 23, 2007.

(51) Int. Cl.
*F04B 17/00* (2006.01)
*F04B 35/00* (2006.01)
*F02B 33/00* (2006.01)

(52) U.S. Cl. ........................ 417/364; 123/561

(58) Field of Classification Search .................. 417/364; 123/561

See application file for complete search history.

(56) References Cited

U.S. PATENT DOCUMENTS

| 5,839,889 A * | 11/1998 | Folsom et al. .................. 418/31 |
| 5,890,468 A * | 4/1999 | Ozawa ........................... 123/561 |
| 2009/0048050 A1* | 2/2009 | Kamada et al. ............... 475/150 |

FOREIGN PATENT DOCUMENTS

| DE | 29 26 426 A1 | 1/1981 |
| DE | 195 81 495 B4 | 1/2007 |
| DE | 10 2006 040 990 A1 | 3/2008 |
| EP | 1 582 716 A1 | 10/2005 |
| JP | 2007002786 A | 1/2007 |

\* cited by examiner

*Primary Examiner* — Anh Mai
*Assistant Examiner* — Zachary J Snyder
(74) *Attorney, Agent, or Firm* — Alfred J. Mangels

(57) ABSTRACT

A compressor drive system for driving a compressor of an internal combustion engine contains a variable speed drive unit and a planetary gear set, the planetary gear set being connected to the internal combustion engine and the compressor in such a way that a first output shaft of the planetary gear set is connected to the compressor, a first drive shaft of the planetary gear set is connected to the internal combustion engine, and a second drive shaft of the planetary gear set is connected to the internal combustion engine through the variable speed drive unit.

7 Claims, 4 Drawing Sheets

COMPRESSOR DRIVE SYSTEM WITH VARIABLE ROTATIONAL SPEED

BACKGROUND OF THE INVENTION

1. Field of the Invention

The present invention relates to a compressor system, and in particular to the compressor drive system for a compressor used to supercharge internal combustion engines.

2. Description of the Related Art

Internal combustion engines are supercharged in order to raise the power or to increase the torque. The improvement through supercharging is achieved through improving the efficiency by increasing the quantity of air in the cylinder. It is known to employ the procedure known as self-supercharging, in which for example a turbocharger driven by the exhaust gases or a compressor driven by means of toothed belts is used, or else to employ the concept of external turbocharging, in which the charge volume, i.e., the quantity of air in the cylinder is increased by means of an auxiliary module, for example by means of a compressor driven by an electric motor. That enables more air, and thus also more oxygen, to be pumped into the combustion chambers of the cylinder, thus enabling the engine power to be increased without increasing the displacement.

At the same time, it is also known to operate mechanically driven compressors with variable rotational speed between the internal combustion engine and the supercharger, that is, the compressor.

Starting from that basis, an object of the present invention is to provide a compact and efficient drive unit for a compressor for supercharging a internal combustion engine, one that can optionally be switched off.

SUMMARY OF THE INVENTION

Briefly stated, in accordance with one aspect of the present invention, the compressor drive system for driving a compressor of a internal combustion engine includes a variable speed drive unit and a planetary gear set. The planetary gear set is connected to the internal combustion engine and to the compressor in such a way that an output shaft of the planetary gear set is connected to the compressor. A first drive shaft of the planetary gear set is connected to the internal combustion engine, and a second drive shaft of the planetary gear set is connected to the internal combustion engine through the variable speed drive unit. The expression "connected" is used here and in the overall description to mean when necessary a direct connection, for example by making a single, one-piece shaft, or else when necessary a connection through transmission gearing or a ratio-changing mechanism, which however requires additional space.

The variable speed drive unit is an element with which a variable, adjustable transmission ratio can be produced between the input shaft of the variable speed drive unit and the output shaft of the variable speed drive unit, and is designed in particular as a hydrostatic transmission, a planetary friction gear set, or a transmission using an endless torque-transmitting means.

The invention is based on the idea of achieving power splitting by way of a planetary gear set, so that the power train running through the variable speed drive unit to drive the compressor can be switched on or off, depending upon the operating state of the internal combustion engine. Furthermore, the system allows compact construction. Because the transmission ratio of the variable speed drive unit is adjustable, the drive torque transmitted to the compressor can also be varied, even when the variable speed drive unit is switched on.

In accordance with a preferred embodiment of the present invention, the output shaft of the planetary gear set is connected to the drive shaft of the compressor; in particular, it is integrally formed therewith.

Preferably, the output shaft of the planetary gear set is the sun gear shaft, the first drive shaft is the ring gear shaft, and the planet carrier shaft is connected to the variable speed drive unit as the second drive shaft of the planetary gear set. With that structure, the greatest part of the power stream can flow by way of the variable speed drive unit.

Alternatively, it is preferred that the output shaft of the planetary gear set be the sun gear shaft, the first drive shaft be the planet carrier shaft, and the ring gear shaft be connected to the variable speed drive unit as the second drive shaft of the planetary gear set. With that structure, the smaller part of the power stream flows by way of the variable speed drive unit.

According to a preferred embodiment, the variable speed drive unit is a planetary friction gear set. That provides one possibility for allowing a mode of adjustment in the variable speed drive unit while keeping the design of the system compact.

According to an alternative embodiment, the variable speed drive unit is designed as a hydrostatic transmission, preferably in such a way that it includes a hydraulic pump and a hydraulic motor. The hydraulic pump, as well as the hydraulic motor, can be executed as vane-type devices, for example. Any other form of hydrostatic transmission can also be utilized, however. Designing the variable speed drive unit as a hydrostatic transmission has the benefit that to switch off the variable speed drive unit train it suffices to set the output side of the variable speed drive unit. The rotational speed of the supercharger then drops off so severely because of the chosen transmission ratios that the supercharger can be regarded as switched off.

Preferably, the compressor drive system with a variable speed drive unit in the form of a hydrostatic transmission includes an adjusting apparatus for adjustment at the pump and/or in the hydraulic circuit and/or at the compressor. The adjustment can be done using one or more of the following options, given as examples. For example, a centrifugal pendulum governor can be utilized to adjust the pump. The pressure difference at a metering orifice in the volumetric flow path between pump and motor can be utilized to make the adjustment. The adjustment can be made using a separate electric adjusting drive, such as an electric motor, stepper motor, or electromagnet. An additional electrically-actuated hydraulic valve can be provided in one of the hydraulic lines. Finally, it is also possible to use the supercharging pressure of the compressor, by producing pilot pressures with the aid of the hydraulic fluid that is present.

According to a preferred embodiment, one design of the variable speed drive unit as a hydrostatic transmission includes a multiway valve that is inserted into the volumetric flow circuit of the variable speed drive unit in such a way that in a first selector position of the multiway valve the hydraulic pump is connected to the hydraulic motor, while in a second selector position the hydraulic pump is short-circuited to the hydraulic tank or reservoir. In the short-circuited state no pressure can come from the transmission, and consequently no shoring up of torque can come from the transmission. The result is that the compressor ceases turning, and thus can be regarded as switched off. A simple 2/2 directional valve can be provided for that purpose. That valve can be operated electromagnetically.

According to a preferred embodiment, a means is provided for securing the output side of the variable speed drive unit. Using such a means, it is possible to selectively hold at least one of the shafts of the variable speed drive unit, for example the output shaft, so that no torque is transmitted via the variable speed drive unit.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

FIGS. 1 through 6 show various embodiments of the compressor drive system 10 for driving a compressor 12 to supercharge a internal combustion engine 16. In the figures, which refer to the various embodiments, the same reference labels are assigned for equivalent structural elements and their description is not repeated.

Figure 1:
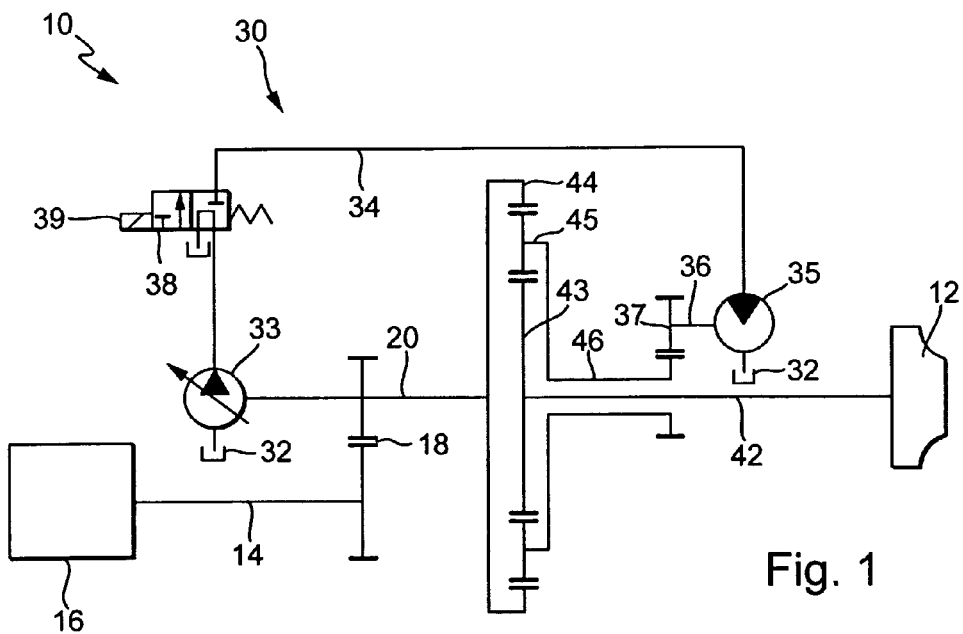
FIG. 1 shows a first embodiment of the compressor drive system, having a hydrostatic transmission as the variable speed drive unit.

In the first embodiment, depicted in FIG. 1, an output shaft 14 of internal combustion engine 16 is connected through a ratio-changing mechanism 18, for example a gear step, to a shaft 20, which is an input shaft both to variable speed drive unit 30 and to planetary gear set 40. Planetary gear set 40 serves as a power splitter, so that one part of the power is transmitted directly through planetary gear set 40 to output shaft 42 of planetary gear set 40 and through the integral design as input shaft of compressor 12 into compressor 12, while another part of the power is introduced through the variable speed drive unit 30 and from there into planetary gear set 40, and then is transmitted to output shaft 42 of planetary gear set 40.

Planetary gear set 40 is of conventional construction design, and includes a sun gear 43 whose sun gear shaft is the output shaft 42 of the planetary gear set. The drive shaft 20 of planetary gear set 40 is connected to the ring gear 44 of planetary gear set 40, and introduces the torque from the internal combustion engine into ring gear 44. In the depicted embodiment, the first drive shaft 20 of planetary gear set 40 is thus the ring gear shaft. The second drive shaft 46, connected to the variable speed drive unit 30, is the planet carrier shaft, i.e., the shaft which is connected to the planet carrier 45 of planetary gear set 40.

The variable speed drive unit is constructed as a hydrostatic transmission 30, and contains a hydraulic pump 33 connected to a tank 32, which may be designed for example as a vane pump. Pump 33 is connected to a hydraulic motor 35 by hydraulic line 34. Hydraulic motor 35, in turn, can also be connected again on its outflow side to the same or another tank 32. Hydraulic motor 35, which is also designed for example as a vane device, has an output shaft 36 which is connected through a ratio-changing mechanism 37 to the planet carrier shaft of planetary gear set 40, i.e., to the second drive shaft 46.

Into hydraulic line 34 between pump 33 and hydraulic motor 35 a 2/2 directional valve 38 (hydraulic valve) is inserted, which is designed as a valve switchable by an electromagnet 39. Hydraulic valve 38 is pre-loaded by a spring in a position in which pump 33 and motor 35 are not connected to each other through hydraulic line 34. Instead, pump 33 is short-circuited to tank 32.

Thus, when valve 38 is in the position depicted in FIG. 1, hydraulic motor 35 can turn freely. This means that there can be no shoring up of torque from the transmission, so that compressor 12 no longer turns. But if current is flowing to electromagnet 39 and line 34 between pump 33 and hydraulic motor 35 is open, hydraulic fluid is circulated through hydraulic line 34 and a large part of the power stream flows through variable speed drive unit 30. Thus, depending on the operating state of internal combustion engine 16, to which the air pressurized by compressor 12 is to be fed, compressor 12 can be operated in various operating states and thus at various air compression levels.

Figure 2:
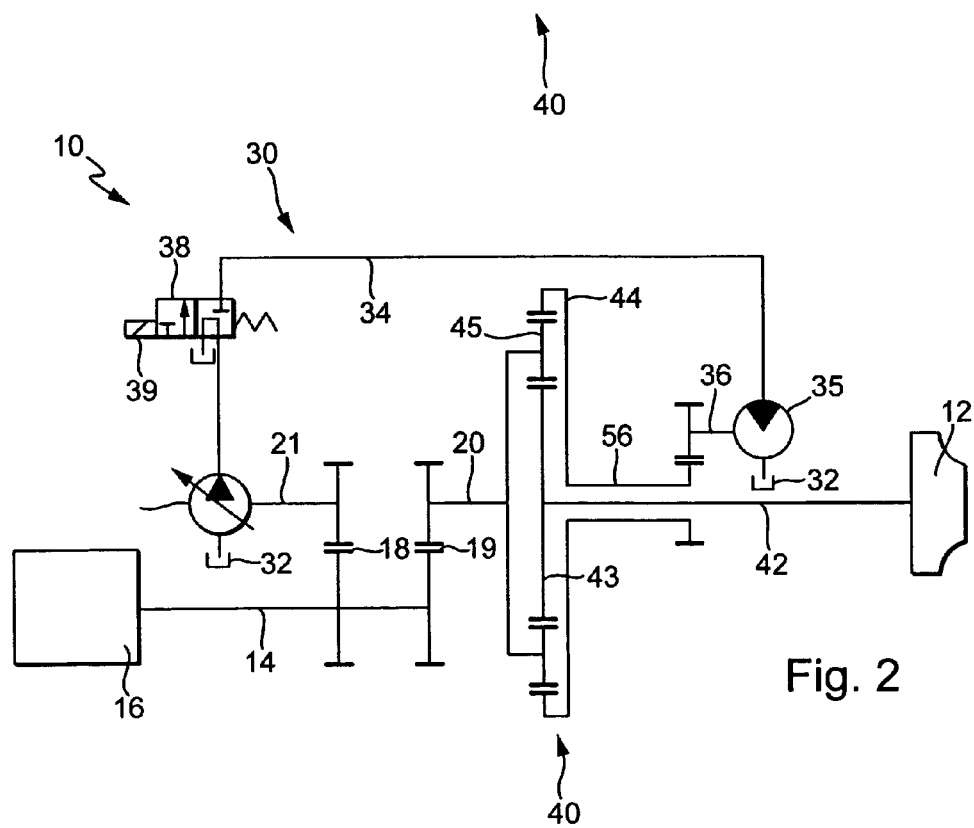
FIG. 2 shows another embodiment of the compressor drive system, having a hydrostatic transmission as the variable speed drive unit.

FIG. 2 shows an alternative embodiment, in which a hydrostatic transmission 30 is also used as the variable speed drive unit. The embodiment shown in FIG. 2 differs from the embodiment shown in FIG. 1 in that the output shaft 36 of hydraulic motor 35 is connected to ring gear 44 via a shaft 56, as well as the output shaft 14 of internal combustion engine 16 being connected via respective ratio-changing mechanisms 18, 19 to the first drive shaft 20 of planetary gear set 40, which is connected to planet carrier 45, and on the other hand to a drive shaft 21 for pump 33. Sun gear 43 in turn is connected via the sun gear shaft, as the output shaft 42 of planetary gear set 40, to compressor 12.

In this arrangement according to FIG. 2 the propulsion is accomplished via planet carrier 45 without the variable speed drive unit being interposed, while the output takes place via sun gear 43 as in FIG. 1. Ring gear 44 is driven additionally via hydrostatic transmission 30 as the variable speed drive unit. This means that the smaller part of the power stream takes place via the variable speed drive unit, while the greater part of the power stream occurs directly from the output shaft 14 of internal combustion engine 16 into planetary gear set 40 and from there via output shaft 42 to compressor 12. This means that a smaller measure of the efficiency of hydrostatic transmission 30 enters into the overall efficiency than in the embodiment illustrated in FIG. 1. The functioning and mode of operation are the same as for the embodiment described in connection with FIG. 1.

Figure 3:
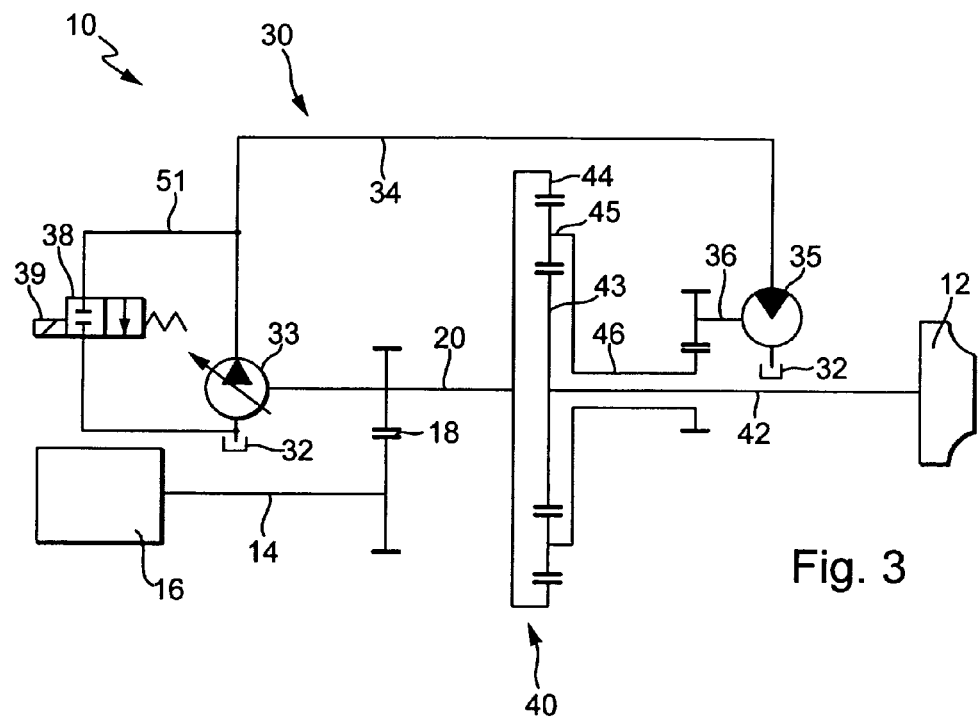
FIG. 3 shows another embodiment of the compressor drive system, having a hydrostatic transmission as the variable speed drive unit.

The embodiment illustrated in FIG. 3 corresponds to that illustrated in FIG. 1 and described in connection therewith, except for the arrangement of valve 38. While in the embodiment illustrated in FIG. 1 valve 38 causes a total blocking of the hydraulic line 34 between hydraulic pump 33 and hydraulic motor 35 in one of its selector positions, with the embodiment illustrated in FIG. 3 the 2/2 directional valve 38 is provided in a bypass line 51, which bypasses hydraulic pump 33. This means that in the closed position, in which bypass line 51 is interrupted, pump 33 is connected to hydraulic motor 35 as in the open position of line 34 in FIG. 1. In the second position of hydraulic valve 38, in which bypass line 51 is open, i.e., a passage is produced, hydraulic motor 35 is short-circuited to tank 32. Hence no pressure, and consequently no shoring up of torque, can come from the transmission 40. Thus compressor 12 no longer turns.

Figure 4:
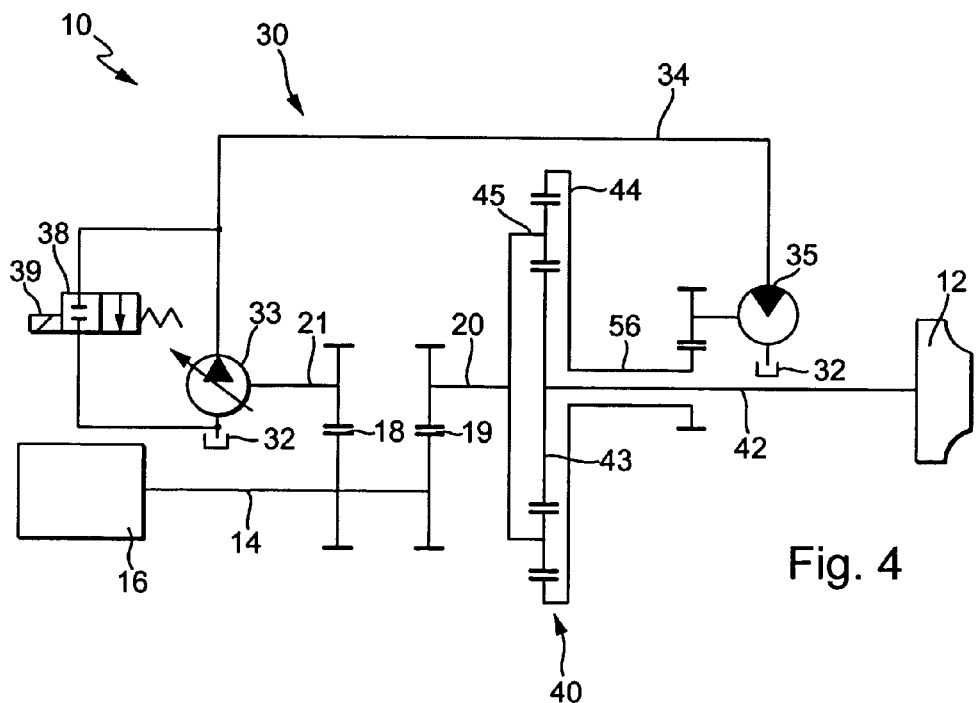
FIG. 4 shows another embodiment of the compressor drive system, having a hydrostatic transmission as the variable speed drive unit.

As FIG. 4 shows, the valve 38 provided in bypass line 51 can also be applied to the embodiment shown in FIG. 2.

Figure 5:
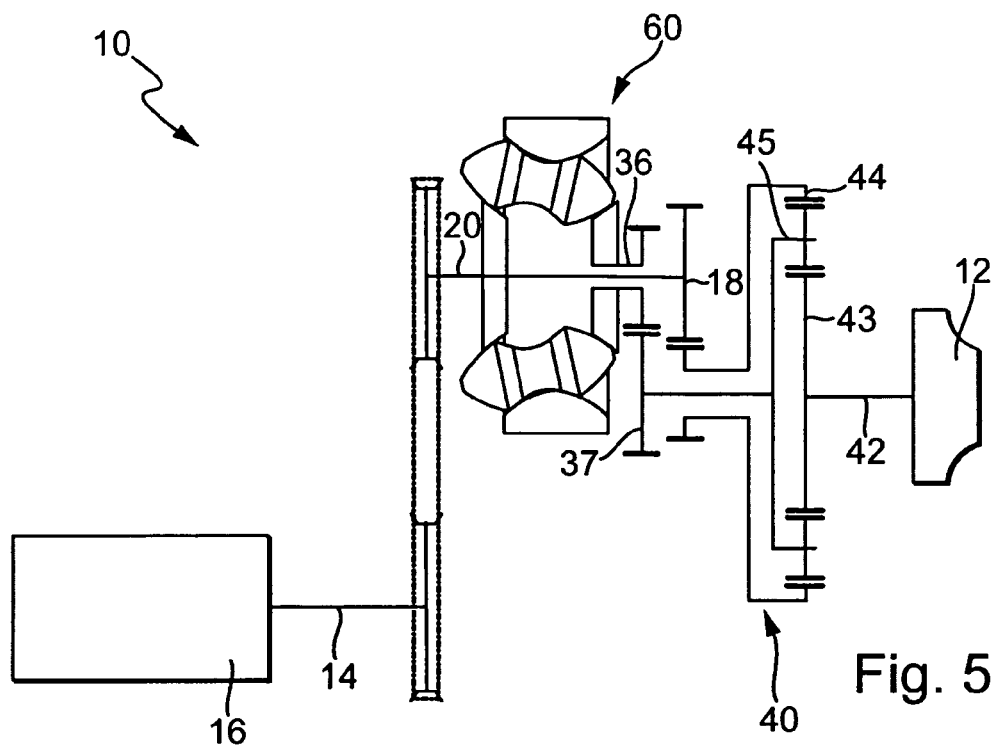
FIG. 5 shows a compressor drive system having a planetary friction gear set as the variable speed drive unit.
Figure 6:
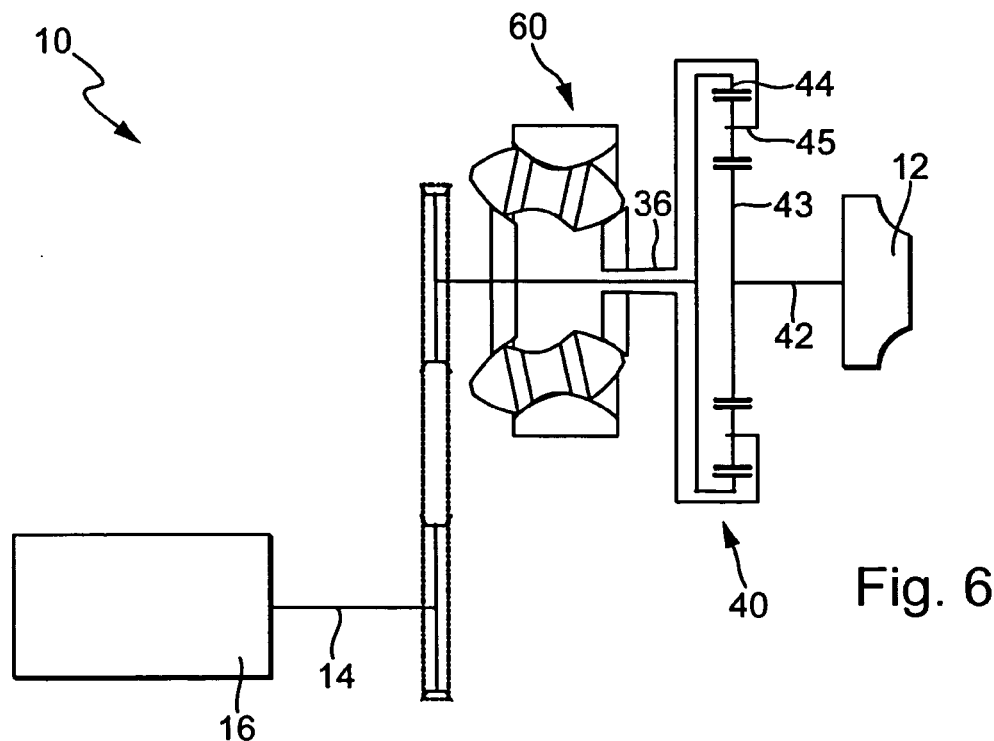
FIG. 6 shows an alternative embodiment of the compressor drive system, having a planetary friction gear set as the variable speed drive unit.

FIGS. 5 and 6 show arrangements in which a planetary friction gear set 60 is employed instead of hydrostatic transmission 30 as the variable speed drive unit. With regard to the power splitting and the insertion of the variable speed drive unit into the power split, the arrangement shown in FIG. 5 corresponds to the embodiment depicted in FIG. 1, in which the output shaft 14 of internal combustion engine 16 is connected via a suitable transmitting and/or ratio-changing mechanism 18 to the ring gear shaft of ring gear 44 of planetary gear set 40, and the input shaft of variable speed drive unit 60 is likewise connected to the ring gear shaft. The output shaft 36 of the variable speed drive unit is connected via a suitable ratio-changing mechanism 37 to the shaft of planet carrier 45, so that the path to planet carrier 45 via variable speed drive unit 60, which is designed as a planetary friction gear set, is an additional drive path of planetary gear set 40. The output shaft 42 of the planetary gear set is the shaft 42 of sun gear 43, and in the depicted embodiment is connected to compressor 12 without an additional ratio-changing mechanism being interposed.

With regard to the power stream, the embodiment depicted in FIG. 6 corresponds to the embodiment depicted in FIG. 2, with a planetary friction gear set 60 again being used as the variable speed drive unit as in FIG. 5. This means that the output shaft 14 of the internal combustion engine serves on the one hand as the input shaft of the variable speed drive unit and on the other hand is connected to the ring gear. The output shaft 36 of the variable speed drive unit on the other hand is connected to planet carrier 45. Sun gear shaft 42, which holds the sun gear 43 of the planetary gear set, represents the output shaft of the planetary gear set and at the same time the input shaft into compressor 12.

Due to the fact that both the hydrostatic transmission as variable speed drive unit and the planetary friction gear set 60 as variable speed drive unit can realize different transmission ratios, an adjusting apparatus is provided with all embodiments, so that the drive of the compressor 12 can be controlled as needed. With the planetary friction gear set 60 this adjustment is determined by differing engagement positions of the friction wheels. With the hydrostatic transmission 30, the mode of adjustment can be accomplished by pilot pressures, electrical positioning drives or the like. Because of the power splitting by means of the planetary gear set 40, it is possible to achieve a compact drive unit that can optionally be shut off, while at the same time designing the variable speed drive unit appropriately for the compressor 12.

Figure 7:
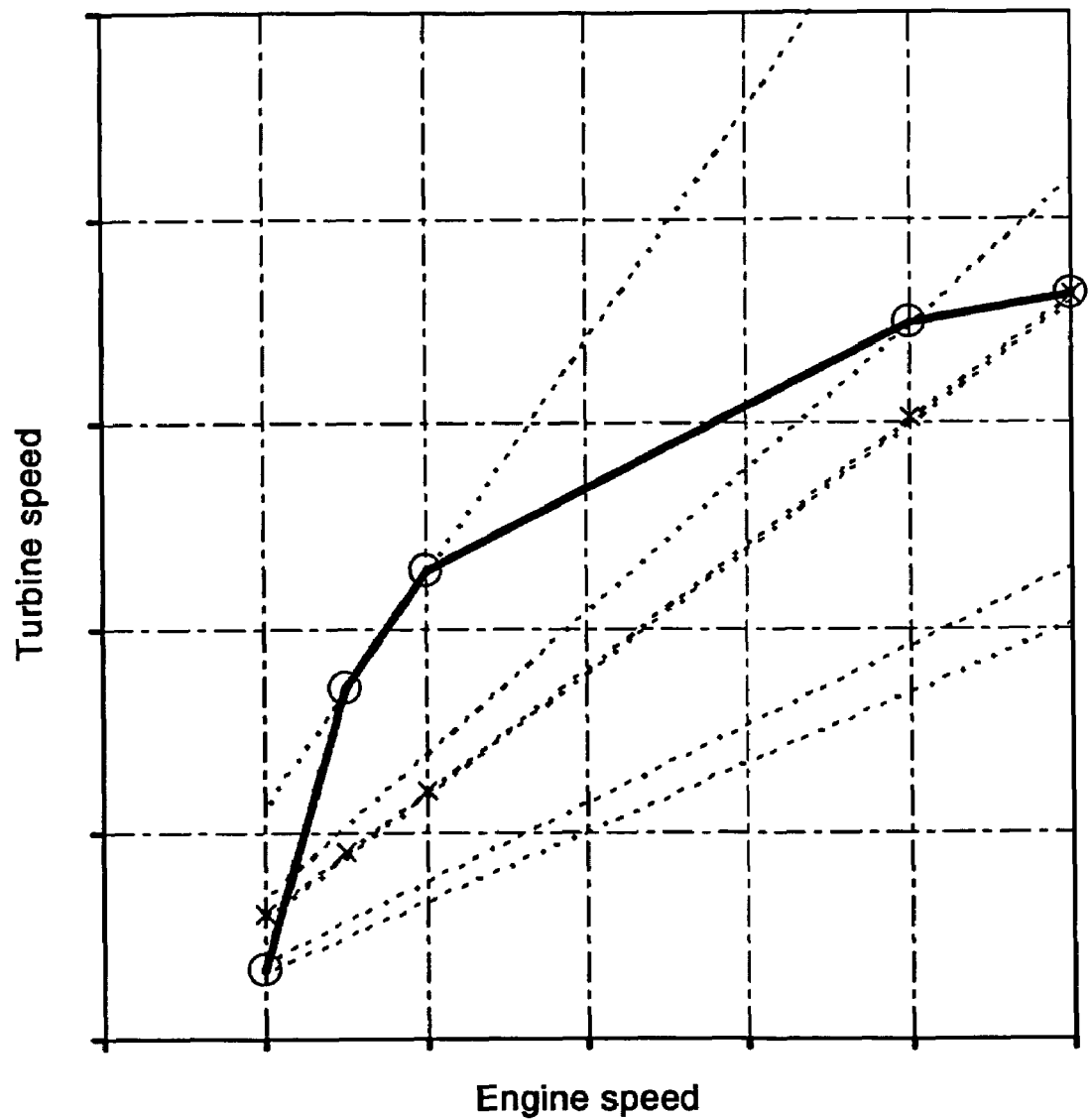
FIG. 7 is a diagram depicting the relationship between turbine speed and engine speed.

FIG. 7 diagrams the rotational speed of the compressor 12 (turbine speed) and the rotational speed of the internal combustion engine 16 (engine speed). The dashed lines designate lines with the same transmission ratio, while the solid line is the characteristic curve of the compressor 12 according to the drive system of the invention. As can be seen from FIG. 7, even at a relatively low engine speed a relatively high turbine speed can be achieved, with corresponding compression.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A compressor drive system for driving a compressor of an internal combustion engine, said drive system comprising:
   a variable speed drive unit connected with an internal combustion engine;
   a planetary gear set including a sun gear, a planet carrier, and a ring gear, the planetary gear set connected to the internal combustion engine and to a compressor, the planetary gear set including a first input shaft connected with the internal combustion engine, a second input shaft connected with the variable speed drive unit, and an output shaft connected to the compressor,
   wherein the variable speed drive unit is designed as a hydrostatic transmission that includes a hydraulic pump and a hydraulic motor; and
   a multiway valve is included in the variable speed drive unit, wherein in a first selector position of the multiway valve the hydraulic pump is connected to the hydraulic motor, and in a second selector position the hydraulic pump is short-circuited to a hydraulic tank.

2. A compressor drive system in accordance with claim 1, wherein the output shaft of the planetary gear set is connected to the sun gear, the first input shaft of the planetary gear set is connected to the ring gear, and the second input shaft of the planetary gear set is connected to the variable speed drive unit.

3. A compressor drive system in accordance with claim 1, wherein the output shaft of the planetary gear set is connected to the sun gear, the first input shaft of the planetary gear set is connected to the planet carrier, and the ring gear is connected to the variable speed drive unit.

4. A compressor drive system in accordance with claim 1, wherein the hydraulic pump is a variable-displacement pump.

5. A compressor drive system in accordance with claim 4, wherein an adjusting apparatus for adjusting the hydraulic pump is provided on one of the pump, in a hydraulic circuit connected to the pump, and on the compressor.

6. A compressor drive system in accordance with claim 1, including securing means for securing the output side of the variable speed drive unit so that no torque is transmitted by the variable speed drive unit.

7. A compressor drive system in accordance with claim 1, wherein the hydraulic pump is a vane pump.

* * * * *